A. BRAUN.
COMBINED SPEED CONTROL AND LOCK FOR AUTOMOBILES.
APPLICATION FILED NOV. 11, 1916.
1,251,176.
Patented Dec. 25, 1917.
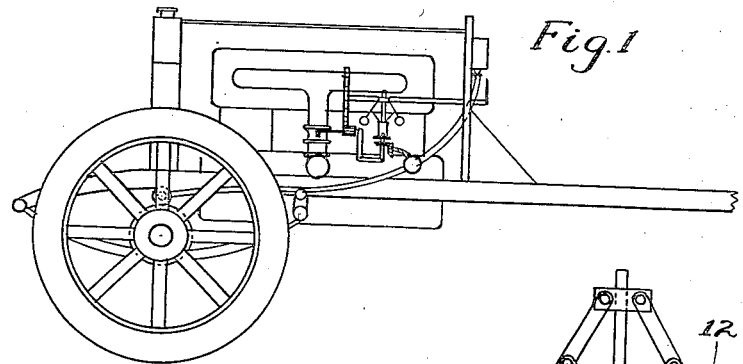
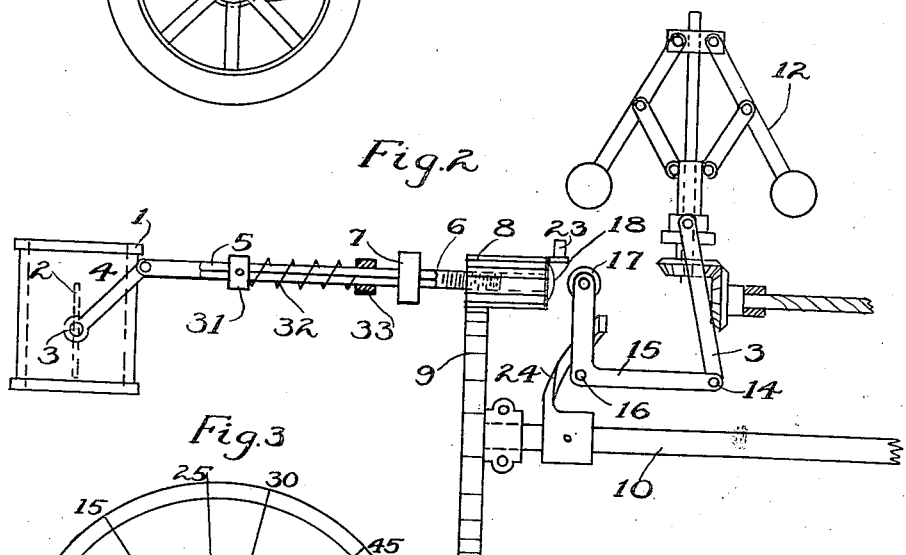
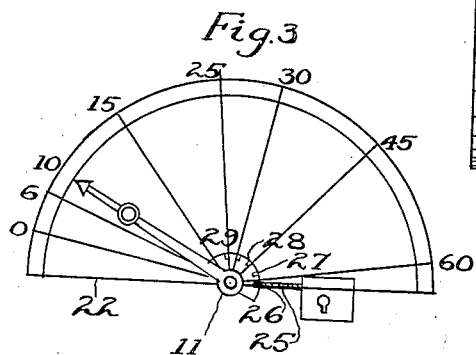
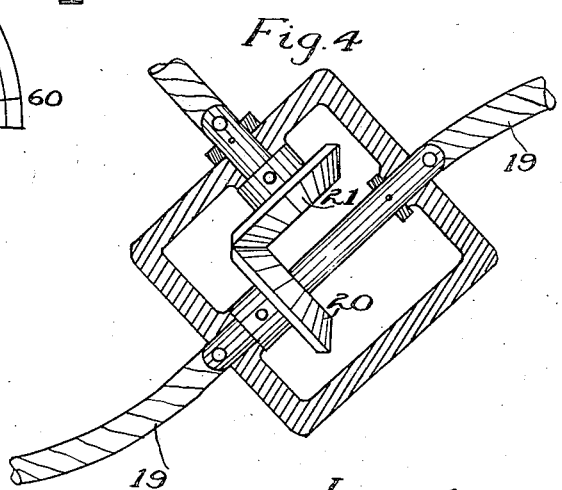
Inventor:
Adolf Braun
by C.D. Enochs
Attorney.

UNITED STATES PATENT OFFICE.

ADOLF BRAUN, OF ST. PAUL, MINNESOTA.

COMBINED SPEED CONTROL AND LOCK FOR AUTOMOBILES.

1,251,176.  Specification of Letters Patent.  Patented Dec. 25, 1917.

Application filed November 11, 1916. Serial No. 130,824.

*To all whom it may concern:*

Be it known that I, ADOLF BRAUN, a subject of the Emperor of Austria, residing at St. Paul, in the county of Ramsey and State of Minnesota, have invented certain new and useful Improvements in Combined Speed Controls and Locks for Automobiles, of which the following is a specification.

One object of my invention is to provide effective means for controlling the maximum rate of speed of an automobile or similar vehicle.

Another object of my invention is to provide settable means for controlling the maximum speed of automobiles and the like.

Another object of my invention is to provide settable and lockable means for controlling the speed of automobiles over a range of from zero speed to the maximum speed of the car.

Another object of my invention is to provide means for controlling the amount of combustible mixture or gas that can be fed to the automobile engine.

Another object of my invention is to provide means for accomplishing the foregoing objects through a connection with the means used in driving the speedometer on the vehicle.

With these and incidental objects in view the invention consists of certain novel features of construction and combination of parts, the essential elements of which are hereinafter described with reference to the drawing which accompanies and forms a part of this specification:

In the drawing, Figure 1 is a side elevation of the front end of an automobile showing my invention applied thereto in conventional form. Fig. 2 is an enlarged detail of the actuating mechanism of my invention. Fig. 3 is a front view of the speedometer dial with setting indicator shown thereon, and Fig. 4 is an enlarged sectional detail of the means whereby I connect to the speedometer cable.

As shown in Fig. 2, a coupling 1 is introduced between the carbureter and the intake manifold, and in this coupling is mounted on trunnion bearings a valve 2 carried by the shaft 3 on which is pinned on the exterior of the coupling a link 4.

The valve 2 is adapted to completely close the opening of the coupling 1 when turned crosswise, and the motion for turning the valve is imparted through the link 4 by the slidable stud 5 having screw threads 6 on the other end thereof.

This stud 5 slides in a squared bearing 7, so as to be non-rotatable.

Threaded on to the threads 6 is a gear 8 having a wide face and meshing with a gear 9 carried by the shaft 10 supported by suitable bearings.

The shaft 10 is carried through suitable universal joints and shaft to the arrow 11, Fig. 3, so that by turning the arrow to any desired mark indicating speed on the speedometer, the gear 9 may be positioned accordingly.

The turning of the gear 9 turns the gear 8 a corresponding amount, the teeth sliding transversely across the face of the gear 9 and screwing the gear 8 on or off of the screw 6, depending upon the direction of rotation of the gear 9.

The motion of the screw 6 opens or closes the valve 2 in proportion to the turning of the gear 9, thereby increasing or decreasing the possible amount of combustible mixture that may be drawn into the engine.

A settable governor 12 of ordinary construction controls in a manner well understood the link 13, hinged at 14 to the bell crank 15, which in turn is hinged to the frame of the device at 16 and the other arm of the bell crank carries a roller 17 adapted to impinge on the head 18 of the gear 8.

The governor 12 is connected to the speedometer cable 19, Fig. 4, by bevel gears 20 and 21, so that the speed of the governor is directly proportional to the speed indicated by the speedometer.

It is evident that as the speed of the car increases, and the balls of the governor rise, the roller 7 will be pushed against the head of the gear 8 and by further motion will partially close the valve 2.

It is also evident that the car speed at which the valve 2 will begin to be moved will depend upon the transverse position of the gear 8, which in turn is regulated as heretofore explained by the turning of the arrow 11.

The result of the action as described is that the arrow 11 may be set at any desired speed, and the speed of the automobile varied at will from zero to the set speed, and that any effort to increase the speed of the automobile above the limit will be fruitless, as it will be impossible to introduce sufficient gas to the engine to increase the speed above the set limit.

It will be noted that the speedometer scale beginning at zero is somewhat above the line 22. If the arrow is turned back to the line 22 and the gear 9 rotated in an anti-clockwise direction, the gear 8 will tend to be turned off the screw 6 until it strikes the stop 23, when its motion transversely will cease and the screw 6 will be retracted, thus closing the valve 2.

In order to make the shutting off more positive, the arm 24 is pinned to the shaft 10 in such a manner that when the arrow is brought back to the line 22, the roller 17 will be thrust against the head 18 of the gear 8, thus effectively closing off the valve 2.

With the arrow set either at the line 22 or at the speed limits 6, 10, 15 and 25, or any other desired speed limits, the lock bolt 25 may be turned by means of a key, so that it will register with notches 26, 27, 28 and 29, respectively, and the limit of speed cannot be changed, except by a party having a key to release the lock.

It is of course understood that these limits may be set at will, and it is especially to be noted that when the arrow is located at the position of the line 22, the valve 2 will be completely shut off, so that no gas can be drawn into the engine, and it is impossible to start it by any means, so that my device not only provides a positive means for limiting the speed of the automobile, but also provides a positive lock for the car when it is idle.

While I have described my invention and illustrated it in one particular design, I do not wish it understood that I limit myself to this construction, as the application of my invention may be varied in many ways within the scope of the following claims:

Claims:

1. In a combined speed control and lock for automobiles, the combination of a governor device controllable through the driving means of a speedometer on the car to which said device is attached, a valve controlling the amount of combustible mixture supplied to the engine of the car, a pinion axially adjustable with respect to said valve, means for axially adjusting said pinion including an indicating device, and means controlled by said governor device for sliding said pinion axially and thereby positioning said valve.

2. In a combined speed control and lock for automobiles the combination, with the speedometer driving means of said automobile, of a governor device, a valve for controlling the amount of combustible mixture fed to the engine of the automobile, a slidable link controlling said valve, a wide-faced pinion mounted on one end of said slidable link by screw engagement, a slidable gear co-acting with said pinion, means controlled by said governor device for sliding said pinion across the face of said gear and thereby actuating said valve, and an indicating device for rotating said gear and thereby screwing said pinion in or out on said slidable link.

3. In a combined speed control and lock for automobiles, the combination of a settable shaft, a gear carried thereby, a wide faced pinion meshing with the teeth of said gear and slidable across the teeth of said gear and having a threaded hole in the center thereof, a non-rotatable stud carried by said pinion with screw engagement and slidably mounted in the frame of the device, a valve for controlling the amount of combustible mixture that may be fed to the engine of the automobile to which the device is attached, controllable by the position of said stud, a stop limiting the slidable motion of said pinion in one direction, a governor, means controllable by said governor for sliding said pinion across the teeth of said gear, and an arm having an inclined projection carried by said settable shaft and adapted when said settable shaft is turned to its extreme position in one direction to mechanically move said means for sliding said pinion across the teeth of said gear to its extreme position, thereby completely closing said valve.

ADOLF BRAUN.